TIMING PULSE GENERATOR CIRCUIT FOR MAGNETIC DRUM

Filed Dec. 20, 1955 2 Sheets-Sheet 1

INVENTORS. H. A. HENNING
O. J. MURPHY
BY Kenneth B. Hamlin
ATTORNEY

INVENTORS. H. A. HENNING
O. J. MURPHY
BY Kenneth B Hamlin
ATTORNEY

United States Patent Office 2,886,802

Patented May 12, 1959

2,886,802

TIMING PULSE GENERATOR CIRCUIT FOR MAGNETIC DRUM

Harley A. Henning, Millington, N.J., and Orlando J. Murphy, New York, N.Y., assignors to Bell Telephone Laboratories, Incorporated, New York, N.Y., a corporation of New York Application December 20, 1955, Serial No. 554,247

10 Claims. (Cl. 340—174)

Figure 1:
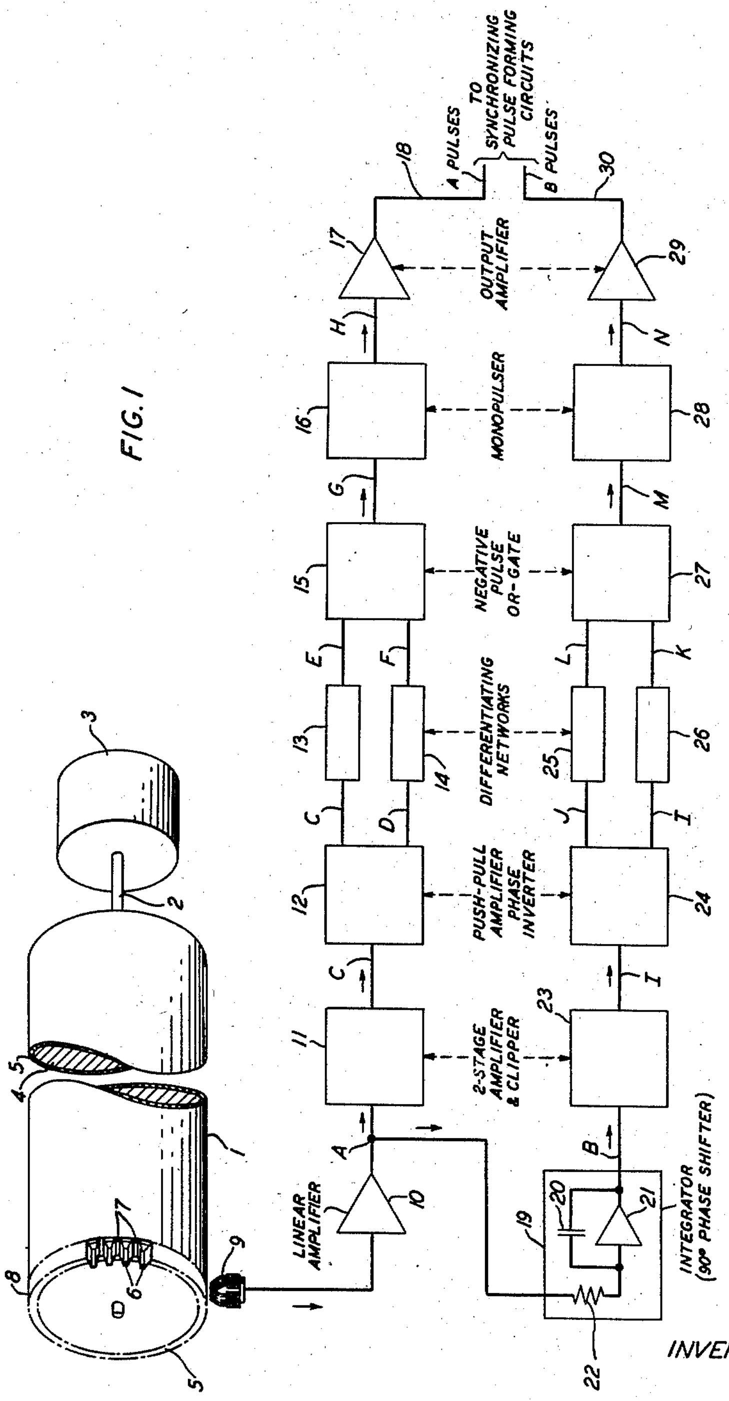

This invention relates to methods and apparatus for controlling data recording or reading operations in incremental areas on the surface of a movable magnetizable medium. More particularly, the present invention relates to a pulse generator circuit for producing timing pulses to contol data recording or reading operations in selected areas on the surface of a rotating magnetic drum.

The use of a magnetic drum as a digital data storage medium is well known. Its ability to store up to several hundred thousand bits of information in a compact space and at a low cost per bit and its ability to store this information in a non-volatile form makes the magnetic drum particularly attractive for use in digital computers and telephone systems.

A magnetic drum essentially comprises a means for rotating a thin cylindrical shell of magnetic material rapidly past one or more magnetic heads located adjacent to but out of contact with the rotating surface. Each magnetic head comprises one or more coils surrounding a core element and may be used either as a recording (writing) or a reading instrumentality.

Magnetic drum data storage systems are based on the principal of producing a pattern of magnetic marks on the surface of the drum for each item of information to be stored. This pattern is arranged in ordered columns, each column being defined by the circumferential area of the drum which passes immediately under or is influenced by a single magnetic head. These columns on the drum are termed "tracks." The marks are further arranged in ordered rows termed "slots" (a contraction of the term "time-slot") as defined by the occurrence of synchronizing pulses produced in response to timing or clock pulses from a timing pulse generator circuit operating in synchronism with the rotation of the drum. The part of a track which is directly under or is influenced by a single magnetic head when a synchronizing pulse occurs and which is defined by the intersection of a track and a slot is known as a "cell" and is the incremental area on the drum surface in which a single magnetic mark may be entered. A slot is, therefore, the aggregate of all the cells of the drum which pass under or are influenced by their respective magnetic heads during the occurrence of any one synchronizing pulse. The simplest arrangement of a slot is a rectangular area running parallel with the axis on the surface of the drum. In the usual case, however, the slot will be more complicated in form. When the various magnetic heads are staggered or positioned in the form of a helix around the drum, the slot pattern on the surface of the drum will be saw-toothed in form or helical in form.

The basic operations of magnetic recording consists of recording magnetic marks, reading them and erasing them. The recording operation may be considered as a writing process and because writing and erasing are complementary processes, they may be considered as writing "X" or writing "0". Initially, in one common form of magnetic recording, the entire drum is magnetized to saturation in the same direction. To record a bit of information in a cell, the cell is magnetized to saturation in the opposite direction by the application of a magnetic field. Due to the retentivity of the magnetic material, the cell will remain magnetized in that direction until restored to normal (erased) by a field of opposite polarity. Data is recorded on and read from the drum by the magnetic heads. A mark is recorded, that is, an X is written, in a particular cell by passing a short pulse of current through the coil of a magnetic head while the head is over that cell. The spot is erased, that is, a 0 written, by passing a current pulse of opposite polarity through the coil on the magnetic head.

In order to control repeated recording or reading operations in slots on a magnetic drum, a train of timing pulses or clock pulses is generated in synchronism with the rotation of the magnetic drum. These clock pulses are then applied to suitable pulse forming circuits to control the production of the required synchronizing pulses which define the location of slots on the drum surface and which synchronize the recording or reading operations therein.

One method heretofore employed for producing the required timing pulses utilizes a series of magnetic marks or X's recorded in a timing track around the circumference of the drum, one mark for each slot on the drum. This track is read by a magnetic head which produces an approximate sinusoidal signal voltage at its output, having one complete cycle of signal for each mark read. This signal is then applied through one stage of amplification to a second over-biased stage of amplification so that only the peak of the positive portion of the sinusoidal voltage excursion provides an output signal and this signal is in the form of a negative going voltage pulse. The leading edge of the negative going pulse is then used to trigger monopulser circuits which produce the required synchronizing pulses. This method of producing timing pulses has several disadvantages. If the timing track, that is, the track in which the magnetic marks or X's have been recorded is mutilated, or the magnetic recordings therein accidentally altered in any way, the information stored on the rest of the drum is useless and all of the stored information as well as the timing track must be erased and rerecorded. Furthermore, due to slight irregularities in the magnetic material on the surface of the drum or due to slight irregularities in the recording of the X signals in the timing track on the drum, the amplitude of the produced sinusoidal signal may vary slightly from cycle to cycle. Because the time in which the over-biased amplifier conducts is controlled by the peak or the amplitude of the signal applied to its input, the interval between the leading edges of the output negative going pulses may vary slightly. As the result of the slight variations in the time at which the timing pulses are produced, the time in which the synchronizing pulses controlled thereby are produced will also vary slightly with the possibility that errors in the recording or reading operations on the drum will result.

A second method heretofore employed for producing the required timing pulses utilizes the peaks of an approximate sinusoidal signal to produce the timing pulses in a manner similar to that described above but produces the approximate sinusoidal signal in a different manner. Instead of recording a series of magnetic marks, one mark for each slot in a timing track on the drum as in the first method described above, a timing wheel in the form of a toothed gear constructed of magnetic material is secured to the shaft on which the magnetic drum turns and is rotated in synchronism with the drum past a polarized magnetic pick-up head. The teeth on the timing wheel are of uniform size and spacing, one tooth being provided for each slot on the magnetic drum. As the gear teeth of magnetic material pass close by the pole tips of the pick-up head, the magnetic reluctance in the air gap between the pole tips changes in a cyclic manner giving rise to a corresponding change of flux. The changing flux induces a nearly sinusoidal voltage in the coils of the pick-up head which is then used to provide the timing pulses in the manner indicated above.

The second method of producing timing pulses thus overcomes one of the disadvantages of the first method, namely, that the timing track cannot so easily be accidentally mutilated or erased. However, the interval between the timing pulses produced by the second method is still susceptible to variation because the technique employed to produce the pulses relies on selecting the peaks of the approximate sinusoidal signal obtained from the magnetic pick-up head associated with the toothed timing wheel.

Another difficulty which may be encountered in utilizing the second method for producing timing pulses results from eddy-currents being induced into the magnetic gear timing wheel by the variation of the magnetic flux between the polarized pick-up head and the teeth of the gear wheel. The eddy-currents flowing in the teeth of the gear timing wheel cause the magnetic shape of the teeth to depart from their physical shape. Because these eddy-currents vary as the frequency of the changing flux varies, slight irregularities or variations in the speed of rotation of the gear wheel will cause the wave shape of the produced sinusoidal signal to vary and may result in slight variations in the time at which the timing pulses are produced.

In magnetic drum data storage systems, it is advantageous to limit the spacing between adjacent slots on the surface of the drum so as to accommodate a greater number of slots. The greater the number of slots, the greater the amount of data that can be stored on a given drum. In order to limit the physical size of magnetic drums, it is, therefore, necessary to make the information density as great as possible which means having as many slots on a drum as possible. Another disadvantage of the above-described second method of producing timing pulses is that as the number of slots on a magnetic drum is increased, the fabrication of a gear tooth timing wheel in which a tooth per slot is provided becomes increasingly more difficult and expensive.

A third method heretofore employed to produce the required timing pulses utilizes four pick-up heads associated with a gear timing wheel. The four pick-up heads are positioned so that the leading edge of a first tooth moves adjacent to a first one of the pick-up heads, then the leading edge of another tooth moves adjacent to a second one of the pick-up heads. This is followed by the leading edge of another tooth moving adjacent to a third one of the pick-up heads and, finally, the leading edge of still another tooth moves adjacent to the fourth one of the pick-up heads. The output signal from each of the four pick-up heads is applied to an individual amplifier where unsymmetrical squaring is accomplished. The four resulting square wave signals are then utilized to trigger two pulse generating circuits which provide two trains of sharply defined pulses. The pulses of each train are synchronous with the rotation of a magnetic drum and occur alternately in time with substantially equal intervals between pulses.

This third method of producing timing pulses overcomes one disadvantage of the first and second methods described above in that the number of magnetic marks required in a timing track or the number of gear teeth required on a timing wheel is reduced by a factor of four. The timing pulses produced by the third method, like those produced by the first and second methods described above, are still susceptible to variations caused by changes in amplitude of the output signals from the pick-up heads. Furthermore, this third method, like the second, may encounter difficulty resulting from eddy-currents in the magnetic timing wheel.

The third method described above for producing timing pulses has additional disadvantages in that four costly pick-up heads, four associated amplifiers and two individual pulse generating circuits (one for each of two trains of alternate timing pulses) are required, thus making this method relatively expensive and complex. In addition, the four pick-up heads must be accurately positioned adjacent to the timing wheel to produce timing pulses at equally spaced intervals. Due to the close tolerances which must be met and maintained, this is difficult and expensive to accomplish.

It is an object of the present invention to provide an improved timing pulse generator circuit for a magnetic drum.

It is another object of the present invention to increase the reliability, dependability and accuracy of timing pulse generator circuits utilized to produce timing pulses for controlling data recording or reading operations in slots on a rotating magnetic drum.

It is a further object of the present invention to reduce the cost of timing pulse generator circuits utilized to produce timing pulses for controlling data recording or reading operations in slots on a rotating magnetic drum.

The present invention, therefore, is an improved pulse generator circuit for producing timing pulses to control data recording or reading operations in slots on a rotating magnetic drum wherein the aforementioned objects are attained.

The timing pulse generator circuit of the present invention is an improvement over such circuits disclosed, for example, in Patent 2,723,311, issued on November 8, 1955, to W. A. Malthaner and H. E. Vaughan; in Patent 2,700,148, issued on January 18, 1955, to J. H. McGuigan, O. J. Murphy and N. D. Newby; and in the copending application of H. A. Henning, E. Jacobitti and B. F. Lewis, Serial No. 418,508, filed on March 25, 1954.

A feature of the present invention relates to circuits and apparatus for producing timing pulses which occur at equally spaced intervals around the circumference of a rotating magnetic drum. The timing pulses thus produced have a constant spatial or phase relationship to the circumferential surface of the magnetic drum rather than a constant time relationship and, hence, are not affected by variations or irregularities in the speed of rotation of the magnetic drum.

Another feature of the present invention relates to circuits and apparatus for utilizing an alternating-current signal voltage for producing timing pulses to control recording or reading operations in slots on a rotating magnetic drum wherein the timing pulses produced are substantially independent of amplitude variations of said signal voltage.

The peak or amplitude of an alternating-current signal voltage is poorly suited for the direct control of events which must be precisely timed within a small fraction of the period of one cycle of the signal itself. Variations in the amplitude of the signal will result in a variation of the times at which events are controlled. However, the zero axis crossings of a sinusoidal wave are independent of amplitude variations and are also the points which, on the basis of amplitude recognition, are most precisely defined in time because the slope of the signal wave is greatest at these points. In accordance with one aspect of the present invention, therefore, the zero axis crossings of a quasi-sinusoidal signal obtained from a timing track on a magnetic drum or a toothed gear timing wheel rotating in synchronism with a magnetic drum are utilized to control the production of timing pulses. Therefore, the timing pulses produced in this manner have a constant phase relationship to the circumferential surface of the magnetic drum and will be unaffected by variations in speed of the magnetic drum or variations in the amplitude of the quasi-sinusoidal signal.

Another feature of the present invention relates to means for reducing the number of magnetic marks in a timing track on a magnetic drum or to means for reducing the number of teeth on a gear timing wheel rotating in synchronism with a magnetic drum when either is utilized to produce timing pulses to control recording or reading operations in slots on a rotating magnetic drum.

In accordance with this aspect of the present invention, an alternating-current signal voltage obtained from a timing track or timing wheel is utilized to produce a predetermined plurality of equally spaced timing pulses for each cycle of the alternating-current signal voltage.

Still another feature of the present invention relates to means for reducing the magnitude and number of detrimental eddy-currents in magnetic timing wheels used to produce timing pulses for controlling data recording or reading operations in slots on a rotating magnetic drum.

In accordance with an illustrative embodiment of this aspect of the present invention, the magnetic gear timing wheel is replaced by a plurality of timing gear teeth cut in the magnetic material on the surface of a magnetic drum. These teeth are formed by cutting a plurality of equally spaced parallel notches in a circumferential track on the drum. The magnetic material between adjacent notches is magnetized and thus forms magnetized timing gear teeth. These teeth pass a non-polarized pick-up head as the drum rotates and produce a quasi-sinusoidal voltage at the output of the head. Because the magnetic material on the surface of the drum is a relatively thin layer, there is insufficient mass of magnetic material in each timing tooth to enable appreciable eddy-currents to form. Accordingly, the magnetic shape of the teeth closely resembles the physical shape and will be almost unaffected by variations in the speed of rotation of the drum. Furthermore, if any small effect of eddy-current distortion remains, it will be about the same as that arising from reading the recorded information in the other tracks on the drum surface and, hence, there will be no relative phase displacement between the timing signals and the information signals as variations in drum rotational speed occur.

Figure 2:
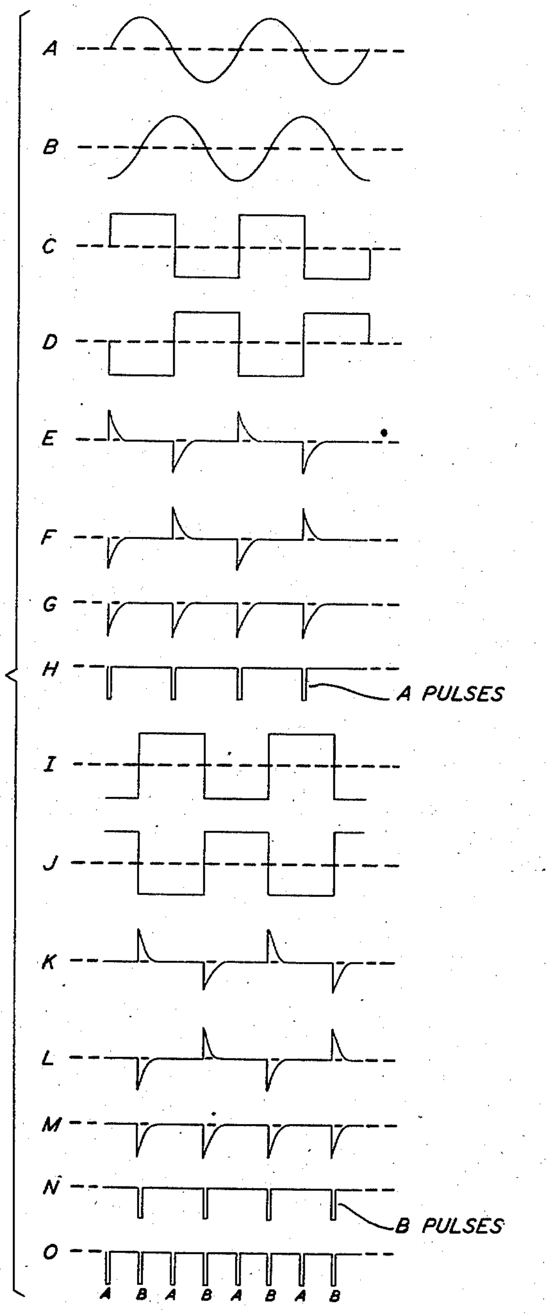

The foregoing and other objects and features of the present invention will be more readily understood from the following description of an illustrative embodiment thereof when read with reference to the accompanying drawings in which:

Fig. 1 shows in block schematic form an illustrative embodiment of the timing pulse generator circuit of the present invention; and Fig. 2 shows graphical representations of voltage waveforms obtained at designated points in the circuit of Fig. 1.

Fig. 1 of the drawings is a block diagram representation of one illustrative embodiment of the timing pulse generator circuit of the present invention which provides at each of two outputs a train of sharply defined equally spaced timing pulses. For purposes of identification, the pulses of the two trains are designated "A-pulses" and "B-pulses" and they occur alternately in time with equal phase intervals between pulses. The timing pulse generator circuit of the present invention may be utilized in any type of magnetic drum system which requires two trains of alternate timing pulses. For example, the circuit may be utilized in the magnetic drum translator disclosed in the above-identified copending application of H. A. Henning, E. Jacobitti and B. F. Lewis. The timing pulse generator circuit of the present invention may also be utilized with any magnetic drum system requiring a single train of timing pulses by combining the two trains of pulses into a single train through the use of a simple circuit expedient well known to those skilled in the art. For example, this circuit may, by combining the pulses of the two trains in a logical Or gate to obtain a single train of equally spaced timing pulses, be utilized in the magnetic drum dial pulse recording and storage register disclosed in the above-identified J. H. McGuigan et al. patent or in the common control telephone system disclosed in the above-identified W. A. Malthaner et al. patent.

As shown in Fig. 1, magnetic drum 1 is mounted on shaft 2 and is rotated continuously by motor 3. Magnetic drum 1 may be constructed of any suitable non-ferrous material on which a thin coating of magnetic material is plated or otherwise applied. This is illustrated in the cut away section of drum 1 shown in the drawing where the basic structure 4 of drum 1 may be an insulating material or material such as brass or aluminum on which a thin layer of magnetic material 5 such as an alloy of nickel and cobalt is electroplated. The thickness of the magnetic material plated on magnetic drum 1 may be, for example, approximately 0.0003 of an inch. This corresponds to a thickness of the order of one "domain" of the magnetic material. Reference may be made to the book entitled, "Ferromagnetism" by R. M. Bozorth, published by D. Van Nostrand Company, Incorporated, in 1951, for a comprehensive discussion of the domain theory of ferromagnetic materials.

As shown in Fig. 1, a timing track indicated generally at 8 is provided on magnetic drum 1 and comprises a series of equally spaced magnetic segments 7 around the circumference of drum 1. These segments 7 are formed by cutting a plurality of equally spaced parallel notches 6 through the magnetic material 5 on the surface of drum 1. The segments 7 of magnetic material 5 between adjacent notches 6 are magnetized and thus form magnetized timing segments or timing gear teeth.

As drum 1 rotates, the magnetized segments 7 pass pick-up head 9 and the magnetic reluctance of the flux path from the magnetized segments through the core structure of pick-up head 9 changes in a cyclic manner giving rise to corresponding changes in magnetic flux in the core structure. The cyclically changing flux in the core structure of pick-up head 9 induces a nearly sinusoidal voltage in the coil of pick-up head 9 and, hence, a quasi-sinusoidal voltage is obtained from the output of pick-up head 9. Pick-up head 9 may be any of the conventional magnetic heads known in the art such as, for example, the magnetic transducer head disclosed in Patent No. 2,592,652, granted to F. G. Buhrendorf on April 15, 1952. The output will be most nearly sinusoidal, as desired, if the gap between the pole tips of the head 9 is adjusted to be approximately equal to the width of the magnetized timing segments.

It is advantageous to have permanent magnetic marks on the surface of the drum to control the production of timing pulses thereby eliminating the possibility of the timing track which is utilized to identify and ultimately control recording or reading operations on the drum from being accidentally mutilated or erased. By cutting the parallel notches in the magnetic material on the surface of the drum as described above and by magnetizing the segments of magnetic material between notches, permanent magnetic marks are thus made on the surface of the drum which are not susceptible to being destroyed or mutilated. Furthermore, by providing the permanent magnetic marks on the surface of the drum in this manner, trouble resulting from eddy-currents experienced in gear timing wheels in the timing circuits used heretofore is reduced because there is insufficient mass of magnetic material in each of the magnetized timing teeth or segments to permit appreciable eddy-currents to form, and any which do form will be similar, in effect, to those which arise from reading the information in the other tracks of the drum. It is to be understood that a timing track having the above-described features could be fabricated through the use of a gear timing wheel made of non-magnetic material in which the individual gear teeth are then electroplated with a thin layer of magnetic material.

To facilitate the design and cutting of a timing track on a magnetic drum or to facilitate the fabrication of gear timing wheels, the number of segments or teeth provided is reduced by a factor of four. In other words, only one magnetized segment or gear tooth is provided for each four slots on a magnetic drum which are to be defined thereby. This factor of four will be made up in the electrical circuits of the present invention as described below. For example, in the illustrative embodiment of the present invention, 512 magnetized segments are provided in the timing track 8 on magnetic drum 1. The sinusoidal signal obtained from the output of pick-up head 9 as magnetic drum 1 makes one complete revolution will, therefore, contain 512 complete cycles. The 512 cycles of the quasi-sinusoidal signal obtained from the output of pick-up head 9 are then used, as will be described below, to produce two trains of timing pulses each containing 1024 sharply defined pulses. The 1024 pulses in each train alternate in time and may be thought of as marking or identifying 2048 equally spaced discrete positions (slot locations) around the circumference of magnetic drum 1.

The quasi-sinusoidal signal from the output of pick-up head 9 is applied to linear amplifier 10. The amplified output sinusoidal signal from linear amplifier 10, shown graphically at A in Fig. 2, is then applied to a two-stage amplifier and clipper circuit 11. It is pointed out that the voltage wave forms shown in Fig. 2 are representative and are given for illustrative purposes only. Each stage of the two-stage amplifier-clipper 11 comprises a symmetrical diode selecting circuit and a linear amplifier. The amplified sinusoidal signal shown at A in Fig. 2 is applied to the diode selecting circuit of the first stage where the signal is symmetrically clipped at approximately one volt above and below the zero axis of the signal. The clipped signal is then amplified in the linear amplifier of the first stage which provides an output trapezoidal wave signal having comparatively rapid rise and fall times. The trapezoidal wave signal is then applied to the diode selecting circuit of the second stage where the signal is again symmetrically clipped at approximately one volt above and below the zero axis of the signal. The resulting signal is again amplified in the linear amplifier of the second stage to provide an output trapezoidal wave signal having still more rapid rise and fall times. The output of the two-stage amplifier-clipper 11 is, therefore, an approximate square wave signal, shown graphically at C in Fig. 2, with axis crossing times coinciding with the axis crossing times of the sinusoidal signal from which it was derived. Amplifier-clipper circuits suitable for use with the present invention are well known in the art and may, for example, be of the type disclosed in Fig. 9.37(*a*) on page 354 of the M.I.T. Radiation Laboratory Series, volume 19, entitled, "Waveforms," published by the McGraw-Hill Book Company, Incorporated, in 1949. The diode selecting circuit shown in this figure is advantageously modified to provide small bias on each of the two diodes so as to provided symmetrical clipping at approximately a volt above and below the zero axis of the input signal.

The approximate square wave signal output from the two-stage amplifier-clipper 11 is applied to the input of push-pull amplifier phase inverter 12 where further steepening of the sides of the square wave is accomplished and from which a pair of antiphase output is obtained. Push-pull amplifier phase inverter circuits are also well known and a typical example is shown in Fig. 7.45 on page 348 of "Radiotron Designers Handbook," published by the Wireless Press in 1952 and reproduced and distributed by Radio Corporation of America. The two output voltage wave forms obtained from push-pull amplifier phase inverter 12 are, therefore, a pair of approximate square wave signals of opposite phase. These are shown graphically at C and D in Fig. 2.

The two antiphase square wave signals are then differentiated in conventional RC differentiating networks 13 and 14, respectively, to obtain two series of positive and negative going spikes as shown graphically at E and F in Fig. 2. The negative going spikes of each of the two signals from the output of differentiating networks 13 and 14 are selected and combined by means of a conventional Or gate 15 responsive to negative going pulses to provide a single output signal comprising a negative going spike for each transition of the original sinusoidal wave through zero, irrespective of the direction of the transition. Typical Or gates which may be utilized in the present invention are disclosed and described on pages 217 through 225 of "The Design of Switching Circuits," by Keister, Ritchie and Washburn, published by D. Van Nostrand Company, Incorporated, in 1951. The wave form of the output signal from Or gate 15 is shown graphically at G in Fig. 2.

As described above, two equally spaced negative going spikes for each cycle of input sinusoidal wave are obtained and these spikes are accurately positioned to correspond to the axis crossings of the sinusoidal signal from which they were derived. The negative going spikes from the output of Or gate 15 are then applied to a conventional cross-coupled single shot multivibrator or monopulser 16 which is designed to provide a negative going pulse of the desired duration which, for example, may be one microsecond. The negative going pulses are initiated by the spikes applied to the input of monopulser 16 and their duration is controlled by the circuit elements of monopulser 16. A typical single shot multivibrator which may be utilized in the present invention is disclosed in Fig. 5·10 on page 168 of the M.I.T. Radiation Laboratory Series, volume 19, entitled, "Waveforms," published by the McGraw-Hill Book Company, Incorporated, in 1949.

The output of the monopulser 16, shown graphically at H in Fig. 2, is applied to output amplifier 17 where the negative going pulses are amplified to the required power level. The amplified pulses from the output of amplifier 17 are designated "A-pulses" as shown in Fig. 1 and are applied over lead 18 to synchronizing pulse forming circuits such as disclosed in the above-identified copending application of H. A. Henning et al., to control the production of the required read and write synchronizing pulses.

The portion of the circuit shown in Fig. 1 thus far described has produced two pulses per cycle of the sinusoidal signal obtained from pick-up head 9. These pulses, designated "A-pulses" occur at equal phase intervals corresponding to the zero axis crossings of this sinusoidal signal and thus have a constant phase relationship to the circumferential surface of magnetic drum 1. As indicated previously, a second train of timing pulses, designated "B-pulses," is produced by the timing pulse generator circuit of the present invention. These B-pulses are also produced at the rate of two pulses per cycle of the output sinusoidal signal from pick-up head 9 and occur at the midpoint of the interval between A-pulses. Therefore, the A-pulses and B-pulses are interspersed at equal phase intervals. The B-pulses are produced in the following manner.

A part of the original quasi-sinusoidal signal, after amplification in linear amplifier 10 but before any clipping takes place, is applied to an integrator phase shift circuit 19 which provides an output sinusoidal signal shifted 90 degrees in phase from the input sinusoidal signal. A typical circuit which may be utilized to produce the 90-degree phase shift is the integrator circuit disclosed in Fig. 18·36 on page 664 of the M.I.T. Radiation Laboratory Series, volume 19, entitled, "Waveforms," published by the McGraw-Hill Book Company, Incorporated, in 1949. An integrating circuit may more advantageously be utilized in the present invention to produce the required 90-degree phase shift rather than a differentiating circuit because the integrating circuit deemphasizes the high frequencies and tends to make the circuit more immune to impulse type noise and other types of high frequency interference. Integrator 19 comprises essentially an amplifier 21 having an input resistor 22 leading to its grid and a capacitor 20 between its grid and plate for feedback. The integral of a sine function is a cosine function and, on a continuous wave basis, a cosine wave is equivalent to a sine wave shifted 90 degrees in phase or one-quarter period in time. The constants of integrator 19 are such that they provide exactly 90 degrees of phase shift at the nominal frequency of the input sinusoidal signal and very nearly 90-degree phase shift for a considerable range of frequencies above and below the nominal. This feature is necessary to accommodate slight changes in the speed of rotation of magnetic drum 1 which may be caused by variations in the supply voltage driving motor 2. The output of integrator 19 is, therefore, a quasi-sinusoidal signal, shown graphically at B in Fig. 2, which is shifted one-quarter period from the input sinusoidal signal.

The shifted sinusoidal signal from the output of integrator 19 is treated in the same manner to produce the B-pulses as the original sinusoidal signal was treated to produce the A-pulses. The signal is applied to two-stage amplifier-clipper 23 from which an approximate square wave signal, shown graphically at I in Fig. 2, is obtained. This square wave signal is applied to push-pull amplifier phase inverter 24 which provides at its outputs, two square wave signals of opposite phase as shown at I and J in Fig. 2. The two antiphase square wave signals are then differentiated in differentiating networks 25 and 26, respectively, to obtain two series of positive and negative going spikes as shown graphically at K and L in Fig. 2. The negative going spikes of each of the two signals from the output of differentiating networks 25 and 26 are selected and combined in Or gate 27. Or gate 27 provides a single output signal, as shown at M in Fig. 2, comprising a negative going spike for each transition of the shifted sinusoidal signal through zero, irrespective of the direction of the transition. As described above, two equally spaced negative going spikes for each cycle of shifted sinusoidal signal are obtained and these spikes are accurately positioned to corrrespond to the axis crossings of the sinusoidal signal from which they were derived. The negative going spikes from the output of Or gate 27 are then applied to cross-coupled single shot multivibrator or monopulser 28 which provides at its output, negative going pulses, shown graphically at N in Fig. 2, of the desired duration. These pulses may, for example, be of the order of one microsecond duration. The negative going pulses are initiated by the spikes applied to the input of monopulser 28 and their duration is controlled by the circuit elements of monopulser 28 to correspond to the duration of the A-pulses from the output of monopulser 16. The output of monopulser 28 is applied to output amplifier 29 where the negative going pulses are amplified to the required power level. The amplified pulses from the output of amplifier 29 are designated B-pulses as shown in Fig. 1 and are applied over lead 30 to synchronizing pulse forming circuits such as disclosed in the above-identified copending application of H. A. Henning et al. to control the production of the required read and write synchronizing pulses.

From the above description, it will be observed that the timing pulse generator circuit of the present invention produces two trains of sharply defined timing pulses. The first train, designated A-pulses, is produced at the rate of two pulses per cycle of the sinusoidal signal obtained from pick-up head 9 and coincides with the axis crossings of this signal. The second train, designated B-pulses, is produced at the rate of two pulses per cycle of the shifted sinusoidal signal obtained from integrator 19 and coincides with the axis crossings of this signal. Because the sinusoidal signal from the output of integrator 19 is shifted exactly 90 degrees or a quarter period from the sinusoidal signal from pick-up head 9, each B-pulse occurs midway between two A-pulses and, likewise, each A-pulse occurs midway between two B-pulses. Four timing pulses are therefore produced for each cycle of the sinusoidal signal generated by timing track 8, each pulse lagging the preceding one by a quarter period of this signal. As indicated hereinbefore, 512 magnetized segments are provided in timing track 8 in the illustrative embodiment of the present invention. These 512 segments induce in pick-up head 9 a quasi-sinusoidal signal having 512 complete cycles for each revolution of drum 1. Therefore, during each revolution of drum 1, four times this number or 2048 sharply defined pulses are produced. The spacings between the pulses are, therefore, not a function of time but a function of phase, and the phase relationship remains constant at all times. Thus, the pulses mark or identify 2048 definite positions (slot locations) on the surface of drum 1 rather than the definite intervals of time. Because the timing pulses produced by the timing pulse generator circuit of the present invention have a constant phase relationship to the surface of the drum, they are, therefore, unaffected by variations in speed of the drum. Furthermore, because the pulses are produced in response to the zero axis crossings of sinusoidal signals, the intervals at which the pulses are produced are unaffected by variations in amplitude of the sinusoidal signals.

As indicated hereinbefore, the timing pulse generator circuit of the present invention may be utilized in a magnetic drum system requiring a single train of timing pulses. The two trains produced as described above may be combined in an Or gate circuit either before or after amplification by output amplifiers 17 and 29. By combining the two trains of pulses prior to amplification, one output amplifier can be eliminated. The resulting single train of sharply defined timing pulses is shown graphically at 0 in Fig. 2.

It is to be understood that the above-described arrangements are but illustrative of the present invention. Numerous other arrangements may be devised by those skilled in the art without departing from the spirit and scope of the invention.

What is claimed is:

1. A pulse generator circuit for generating timing pulses to control recording or reading operations on a rotating magnetic drum comprising in combination, a signal generator operating in synchronism with the rotation of said drum to produce an alternating-current signal voltage, pulse generating means for producing signal pulses of predetermined duration and means controlled by the zero axis crossing of said alternating-current signal voltage for controlling said pulse generating means to generate at a predetermined plurality of equal phase intervals, a signal pulse having a fixed and predetermined phase relationship to the circumferential surface of said drum.

2. A pulse generator circuit for generating timing pulses to control recording or reading operations on a rotating magnetic drum comprising in combination, a signal generator operating in synchronism with the rotation of said drum to produce a first alternating-current signal voltage having a predetermined number of cycles per revolution of said drum, means responsive to said first alternating-current signal voltage for producing a second alternating-current signal voltage shifted 90 degrees out of phase therewith and means controlled by the zero axis crossings of said first and said second alternating-current signal voltages for producing a predetermined plurality of signal pulses at predetermined equal phase intervals for each cycle of said first alternating-current signal voltage.

3. A pulse generator circuit for generating timing pulses to control recording or reading operations on a rotating magnetic drum comprising in combination, a signal generator operating in synchronism with the rotation of said drum to produce a first alternating-current signal voltage having a predetermined number of cycles per revolution of said drum, means responsive to said first alternating-current signal voltage for producing a second alternating-current signal voltage shifted 90 degrees out of phase therewith, means responsive to said first and said second alternating-current signal voltages for producing voltage spikes coincident with the zero axis transitions thereof and means controlled by said voltage spikes for generating a signal pulse of predetermined duration coincident with each transition through the zero axis of said first and said second alternating-current signal voltages.

4. A pulse generator circuit for generating timing pulses to control recording or reading operations on a rotating magnetic drum comprising in combination, a signal generator operating in synchronism with the rotation of said drum to produce a first sinusoidal signal having a predetermined number of cycles per revolution of said drum, means responsive to said first sinusoidal signal for producing a second sinusoidal signal shifted 90 degrees out of phase therewith, a first square wave producing means controlled by said first sinusoidal signal for producing a first square wave signal having zero axis transitions coincident with the zero axis transitions of said first sinusoidal signal, first pulse generating means for producing timing signal pulses of predetermined duration, means responsive to said first square wave signal for controlling said first pulse generating means to initiate a timing signal pulse coincident with each transition of said first square wave signal through the zero axis, a second square wave producing means controlled by said second sinusoidal signal for producing a second square wave signal having zero axis transitions coincident with the zero axis transitions of said second sinusoidal signal, a second pulse generating means for producing timing signal pulses of predetermined duration and means responsive to said second square wave signal for controlling said second pulse generating means to initiate a timing signal pulse coincident with each transition of said second square wave signal through the zero axis.

5. The combination of claim 4 wherein said first and said second square wave producing means each comprises clipping means for symmetrically clipping in the rapid-rise region above and below the zero axis, said sinusoidal signal applied thereto and amplifying means for amplifying the resulting clipped signal.

6. A pulse generator for generating timing pulses to control recording or reading operations on a rotating magnetic drum comprising in combination, a plurality of magnetized segments of magnetic material, a magnetic pick-up head, means for moving said segments past said head in synchronism with the rotation of said drum to induce an alternating-current signal voltage in said head, means responsive to said alternating-current signal voltage for producing a second alternating-current signal voltage shifted 90 degrees out of phase therewith and means responsive to the zero axis crossing of said two alternating-current signal voltages for producing a predetermined number of signal pulses with equal phase intervals therebetween, each of said signal pulses having a fixed and predetermined phase relationship to the circumferential surface of said drum.

7. A pulse generator circuit for generating timing pulses comprising in combination, a magnetic drum comprising a cylinder of non-magnetic material having a plating of magnetic material deposited thereon, a timing track extending circumferentially around the periphery of said drum comprising a plurality of segments of said magnetic material plated on said cylinder, a magnetic pick-up head located adjacent to said timing track, means for continuously rotating said drum whereby said timing track induces an alternating-current signal voltage in said head, means responsive to said alternating-current signal voltage for producing a second alternating-current voltage shifted 90 degrees out of phase therewith and means responsive to the zero axis transitions of said two alternating-current signal voltages for producing a predetermined plurality of signal pulses at equal predetermined phase intervals for each cycle of said alternating-current signal voltage induced in said head.

8. A pulse generating circuit for generating timing pulses to control recording or reading operations on a rotating magnetic drum comprising in combination, a plurality of magnetized segments of magnetic material, each having a thickness of the order of one domain of said magnetic material, a magnetic pick-up head, means for moving said segments past and closely adjacent to said head in synchronism with the rotation of said drum to induce a quasi-sinusoidal signal voltage in said head, pulse generating means for producing signal pulses of predetermined duration and means responsive to the zero axis crossings of said quasi-sinusoidal signal voltage for controlling said pulse generating means to generate a predetermined plurality of signal pulses at predetermined equal phase intervals for each cycle of said quasi-sinusoidal signal voltage.

9. A pulse generator circuit for generating timing pulses to control recording or reading operations on a rotating magnetic drum comprising in combination, a plurality of magnetized segments of magnetic material, each having dimensions narrow in width, relatively long in length and having a thickness of the order of one domain of said magnetic material, a magnetic pick-up head, means for moving said segments past and closely adjacent to said head to induce a first sinusoidal signal in said head, means responsive to said first sinusoidal signal for producing a second sinusoidal signal shifted 90 degrees out of phase therewith, first square wave producing means controlled by said first sinusoidal signal for producing a first square wave signal having zero axis transitions coincident with the zero axis transitions of said first sinusoidal signal, second square wave producing means controlled by said second sinusoidal signal for producing a second square wave signal having zero axis transitions coincident with the zero axis transitions of said second sinusoidal signal, pulse generating means for producing timing signal pulses of predetermined duration and means responsive to said first and said second square wave signals for controlling said pulse producing means to initiate a timing signal pulse coincident with each transition of said square wave signals through the zero axis.

10. The combination of claim 9 wherein said first and said second square wave producing means each comprises a plurality of clipping means for symmetrically clipping, near the zero axis, the signals applied thereto and a plurality of associated amplifying means for amplifying the resulting clipped signals.

References Cited in the file of this patent

UNITED STATES PATENTS

| | | |
|---|---|---|
| 2,185,300 | Hickman | Jan. 2, 1940 |
| 2,370,166 | Hooven | Feb. 27, 1945 |
| 2,540,654 | Cohen et al. | Feb. 6, 1951 |
| 2,609,143 | Stibitz | Sept. 2, 1952 |
| 2,700,148 | McGuigan et al. | Jan. 18, 1955 |
| 2,797,402 | Duffey et al. | June 25, 1957 |